United States Patent
Ansari et al.

(10) Patent No.: US 11,803,619 B2
(45) Date of Patent: Oct. 31, 2023

(54) SYSTEMS AND METHODS OF DIGITAL CONTENT CERTIFICATION AND VERIFICATION USING CRYPTOGRAPHY AND BLOCKCHAIN

(71) Applicant: NASDAQ, INC., New York, NY (US)

(72) Inventors: Akbar Ansari, Hopkinton, MA (US); Thomas Fay, Succasunna, NJ (US); Adnan Ali Lone, Framingham, MA (US)

(73) Assignee: NASDAQ, INC., New York, NY (US)

( * ) Notice: Subject to any disclaimer, the term of this patent is extended or adjusted under 35 U.S.C. 154(b) by 155 days.

(21) Appl. No.: 17/530,207

(22) Filed: Nov. 18, 2021

(65) Prior Publication Data

US 2022/0075846 A1   Mar. 10, 2022

Related U.S. Application Data

(62) Division of application No. 16/251,570, filed on Jan. 18, 2019, now Pat. No. 11,210,369.

(60) Provisional application No. 62/619,248, filed on Jan. 19, 2018.

(51) Int. Cl.
| | |
|---|---|
| *G06F 21/10* | (2013.01) |
| *H04L 9/32* | (2006.01) |
| *H04L 9/06* | (2006.01) |
| *G06F 21/64* | (2013.01) |
| *H04L 9/00* | (2022.01) |

(52) U.S. Cl.
CPC .............. *G06F 21/10* (2013.01); *G06F 21/64* (2013.01); *H04L 9/0643* (2013.01); *H04L 9/3239* (2013.01); *H04L 9/3247* (2013.01); *H04L 9/3263* (2013.01); *G06F 2221/0737* (2013.01); *G06F 2221/2101* (2013.01); *H04L 9/50* (2022.05); *H04L 2209/60* (2013.01)

(58) Field of Classification Search
None
See application file for complete search history.

(56) References Cited

U.S. PATENT DOCUMENTS

| | | | |
|---|---|---|---|
| 9,852,300 B2 * | 12/2017 | Lindteigen | .............. H04L 9/088 |
| 10,505,741 B1 | 12/2019 | Conley | |
| 10,579,779 B2 | 3/2020 | Wright | |
| 10,686,610 B2 | 6/2020 | Tong | |
| 2007/0118730 A1 | 5/2007 | Platt | |
| 2016/0283920 A1 | 9/2016 | Fisher et al. | |
| 2016/0364787 A1 | 12/2016 | Walker et al. | |
| 2017/0116693 A1 | 4/2017 | Rae | |

(Continued)

FOREIGN PATENT DOCUMENTS

| | | |
|---|---|---|
| CN | 106489258 | 3/2017 |
| WO | 2016/128568 | 8/2016 |
| WO | 2017/201489 | 11/2017 |

OTHER PUBLICATIONS

Sutton, Andrew et al., "Blockchain Enabled Privacy Audit Logs", Springer International Publishing AG 2017, C. d'Amato et al. (Eds.) : ISWC 2017, Part I, LNCS 10587, pp. 645-660. (Year: 2017).*

(Continued)

*Primary Examiner* — Michael Pyzocha
(74) *Attorney, Agent, or Firm* — Nixon & Vanderhye P.C.

(57) ABSTRACT

A verification computer system is provided that provides for content certification and verification using cryptography and a blockchain.

20 Claims, 9 Drawing Sheets

(56) References Cited

U.S. PATENT DOCUMENTS

| | | | |
|---|---|---|---|
| 2017/0214522 A1 | 7/2017 | Code | |
| 2018/0157700 A1* | 6/2018 | Roberts | G06F 16/2365 |
| 2018/0189312 A1* | 7/2018 | Alas | H04L 9/3239 |
| 2018/0285839 A1* | 10/2018 | Yang | G06Q 20/3829 |
| 2018/0287797 A1* | 10/2018 | Banerjee | H04L 9/32 |
| 2018/0316665 A1* | 11/2018 | Caldera | H04L 63/08 |
| 2018/0359091 A1 | 12/2018 | Puentes | |
| 2018/0374173 A1 | 12/2018 | Chen | |
| 2019/0058910 A1 | 2/2019 | Solow | |
| 2019/0073670 A1* | 3/2019 | Ganesan | G06F 16/27 |
| 2019/0102782 A1 | 4/2019 | Diehl | |
| 2019/0171620 A1 | 6/2019 | Mccollum | |
| 2019/0173854 A1 | 6/2019 | Beck | |
| 2019/0251648 A1 | 8/2019 | Liu | |
| 2020/0143367 A1 | 5/2020 | Lebeau | |
| 2020/0168033 A1* | 5/2020 | Mcqueen | G07F 17/326 |
| 2020/0186361 A1 | 6/2020 | Almgren | |
| 2020/0201681 A1* | 6/2020 | Thompson | G06F 9/5027 |
| 2020/0229941 A1* | 7/2020 | Kaddoura | A61F 2/4465 |
| 2022/0370108 A1* | 11/2022 | Reed | G06Q 20/105 |

OTHER PUBLICATIONS

Nakamoto, Satoshi, "Bitcoin: A Peer-to-Peer Electronic Cash System," www.bitcoin.org, Nov. 2008, 9 pages.
Notification of Transmittal of the International Search Report and the Written Opinion of the International Searching Authority, in International Application No. PCT/US2019/14194 dated May 17, 2019 (77 pages).

\* cited by examiner

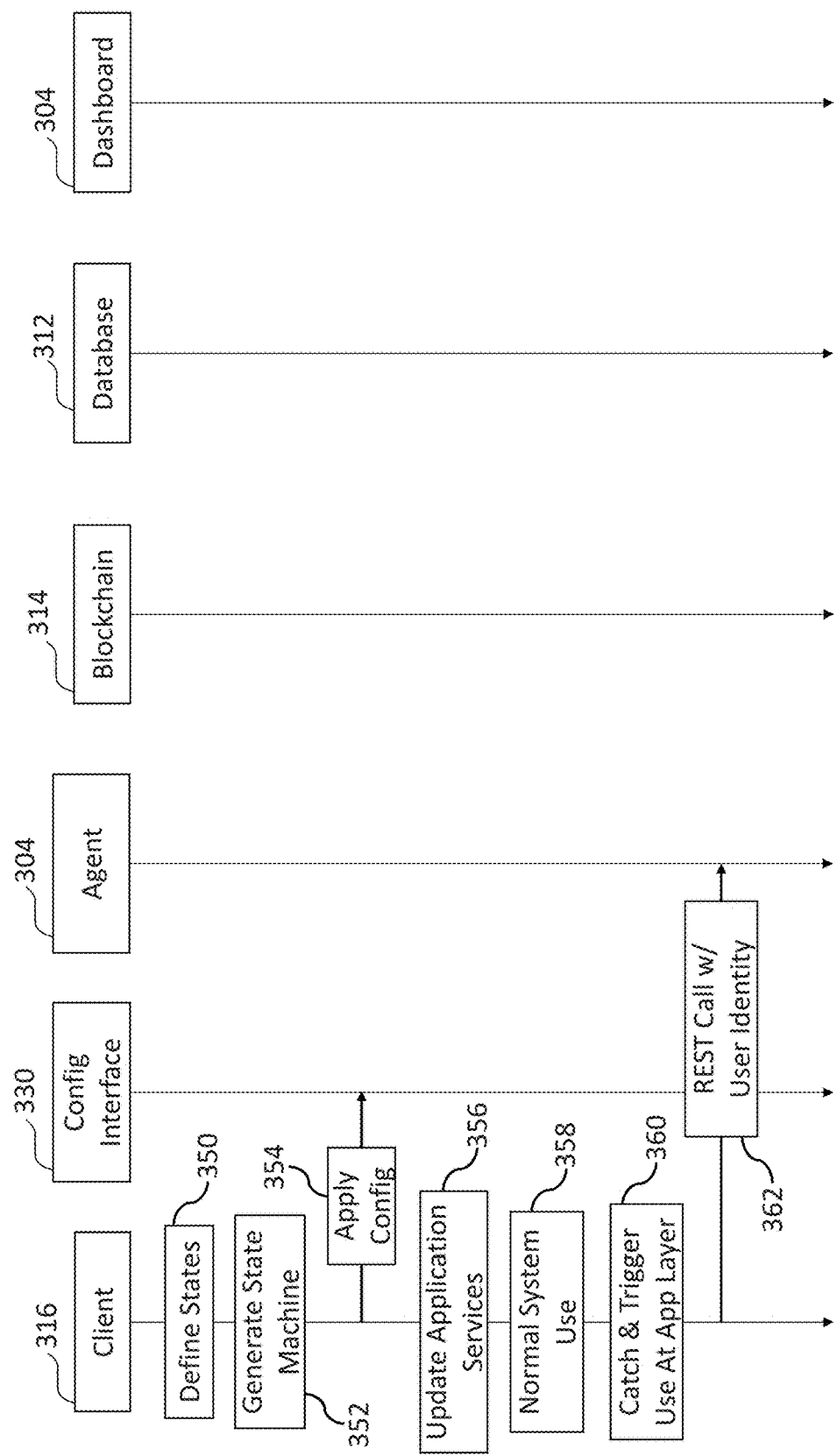

SYSTEMS AND METHODS OF DIGITAL CONTENT CERTIFICATION AND VERIFICATION USING CRYPTOGRAPHY AND BLOCKCHAIN

CROSS REFERENCE(S) TO RELATED APPLICATION(S)

This application is a divisional of U.S. application Ser. No. 16/251,570, filed Jan. 18, 2019, now allowed; which claims priority to U.S. Provisional Application No. 62/619,248, filed Jan. 19, 2018, the entire contents of which are hereby incorporated by reference.

TECHNICAL OVERVIEW

The technology herein relates to integrity verification of digital data. More particularly, the technology herein relates to systems that integrate with a blockchain to provide for certification and verification of the origin and integrity of digital data as it is created, edited, and/or released (e.g., over an electronic medium such as the Internet).

INTRODUCTION

Verifying the origin or the integrity of content (e.g., whether in the form of general news releases or more specific informational notices) is an important issue in modern society. Individuals, organizations, and others rely on the integrity of disseminated content or information to make important decisions. For example, an organization may receive weather reports that are used for determining whether an office location should be closed. Or a company may receive informational notices that relate to the tracked locations of packages. These operational issues for organizations are combined with the issue that fake information content (e.g., news) can cause public distrust, adverse economic impact, and reputational damage to organizations. The reliance or use of such information has only increased in recent years due to the ease by which digital content or information can be distributed across the Internet and other digital mediums.

Accordingly, organizations and individuals are continually interested in techniques by which the origin and the integrity of data content can be certified or verified. For example, so that information that is being disseminated (e.g., over the internet) can be verified. There is thus a need to develop systems, processes, and/or techniques to address these and other issues.

SUMMARY

In certain example embodiments, a computer system provides reliable certification of the origin and the integrity of data content that has been, is, or will be disseminated over the internet. This may be accomplished by providing the consumer of the content an interface by which to independently verify the origin and original data content through the use of cryptographic algorithms and/or the blockchain.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 3B and 3C are signal diagrams showing operation of the system(s) shown in FIG. 3A;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

FIG. 1

Figure 1:
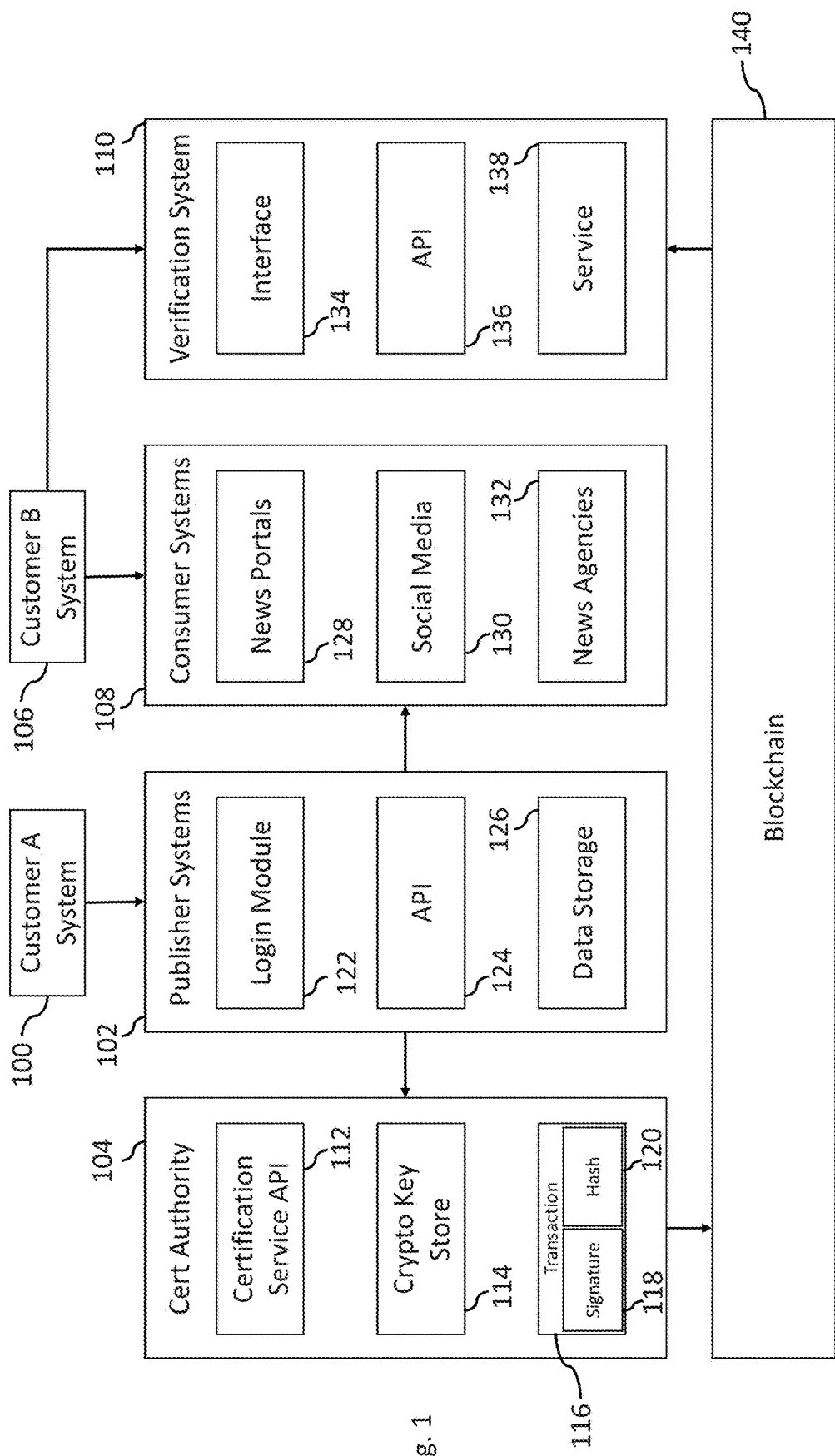
FIG. 1 illustrates a non-limiting example function block diagram of a computer-implemented information system that interfaces with a blockchain according to certain example embodiments.

FIG. 1 illustrates a non-limiting example function block diagram of a computer-implemented information system that interfaces with a blockchain according to certain example embodiments.

A publisher computer system 102 communicates with customer A computer system 100 being used by a publisher of informational content. Publisher computer systems 102 may include one or more of the computing devices shown in FIG. 5 (e.g., a server or the like).

In certain examples, users are authenticated against publisher systems 102 via login module 122 (e.g., via a username/password combination) and/or other authentication processes. Users of publisher systems 102 may be verified users that belong to a verified legal entity (e.g., a company or the like).

Login module 122 may also include functionality that allows users to create content such as news or press releases via a portal provided in connection with the login module 112 and/or the API module 123. For example, a user may provide input through a web page or the like to create content that will be disseminated for mass consumption via internet portals 128, social media, 130, and/or news agencies 132, etc. In certain examples, the content that is to be disseminated can be transferred (e.g., uploaded) from the customer A computer system 100 to the publisher computer system 102. For example, a PDF or Microsoft Word® document may be uploaded as the content that will be disseminated. Once the content is created or uploaded to the publisher computer system 102 it may be stored to local data storage 126.

Certification authority computer system 104 exposes certification service APIs 112 to publisher systems 102. Crypto Key store 114 stores public and private keys for content publishers and customers for that publisher. In certain examples, certification authority computer system 104 may generate private/public keys for any user or other entity that wishes to disseminate information. The public and private keys are used to provide cryptographic proof that the content creator is authentic (e.g. that someone claiming to be Reuters is actually Reuters) and that the content itself is authentic (e.g. that it has not been tampered with). Certification authority computer system 104 also generates blockchain transactions 116 that include or are based on signature(s) 118 and/or hashes 120.

Signatures may be formed via a cryptographic algorithm that takes an input hash and a private key and returns a unique set of bits (e.g., the signature). Keys (e.g., those stored in crypto key store 114) may be a piece of information that determines the functional output of a cryptographic algorithm or cipher. Without a key, an algorithm would not produce a useful result. Certain example embodiments described herein may use multi-signature techniques. Multi-signature may include techniques for requiring more than one party (and their corresponding "keys") to approve a transaction. For example, two or more keys may be required for authorizing a blockchain transaction (or certain types of blockchain transactions).

Certification authority computer system 104 interfaces with blockchain 140. Specifically, certification authority computer system 104 submits blockchain transactions that it has generated to the blockchain for verification and/or incorporation into the blockchain 140.

The blockchain technology (sometimes simply referred to as blockchain) has been used in digital currency implementations and is described in a 2008 article by Satoshi Nakamoto, called "Bitcoin: A Peer-to-Peer Electronic Cash System," the entire contents of which are hereby incorporated by reference. A blockchain (like blockchain 140) is a data structure that stores a list of transactions and can be thought of as a distributed electronic ledger that records transactions between source identifier(s) and destination identifier(s). The blockchain may also be thought of as a sequential transaction database. In any event, this data structure is stored on a blockchain computer system (not shown) that may include a plurality of computer devices or nodes (e.g., each of which may be an instance of the device shown in FIG. 6) that communicate with each other over an electronic data communications network.

The transactions that makeup the blockchain are bundled into blocks and every block (except for the first block) refers back to or is linked to a prior block in the chain. Computer nodes maintain the blockchain and cryptographically validate each new block and thus the transactions contained in the corresponding block. This validation process includes solving a computationally difficult problem that is also easy to verify and is sometimes called a "proof-of-work."

Whenever it is described in this document that data (whether a transaction, or any other type of data) is stored on the blockchain, such storing may include: the initial reception of the transaction to the blockchain 140 (or one of the nodes that store the blockchain therein); the cryptographic verification of the transaction (e.g., its incorporation into a "block" of the blockchain); and/or a determination that the transaction is now computationally immutable (e.g., multiple blocks have been linked to the blockchain that incorporated the at-issue transaction).

Each transaction (or a block of transactions) is incorporated/included into the blockchain 140 via a proof-of-work mining process. For example, each node may attempt to "mine" a solution to the hash of a block or a transaction. Hashes (also referred to herein as "hash functions," "cryptographic hash functions," and the like) include functions that map an initial input data set to an output data set. The output from a hash function may be referred to herein as a "hash identifier," "hash value," "hash data set," or simply, a "hash"). Generally, the output values from a given hash function have the same fixed length. Generally, if the same hash function is used on the same input data it will result in the same output data value. With some hash functions (including those used in the context of blockchain techniques and/or the subject matter of this application) the input value is computationally difficult to determine when only the output value is known. In certain examples, the input value for the hash function is supplemented with some additional random data. For example, an input value of "blockchain" for a hash function may include addition random data such as three random characters. Accordingly, the data value that is hashed may be "blockchaina5h" instead of simply "blockchain." The additional random data is sometimes called a "nonce."

In order to validate a new block into the blockchain, the proof of work process (or hash operation process) that is performed may include finding an input hash value (i.e., the block) that results in an output hash value that meets a given condition. As the data related to the blockchain transactions in the blockchain are fixed, miners (e.g., nodes on the blockchain) modify the nonce value that is included as part of the block being validated until the output value of the hash function meets the given condition. For example, a target output value may have zeros as the first four numbers of the hash. This is a problem that may be computationally difficult to determine, yet relatively easy to verify. It will be appreciated, that other types of proof-of-work approaches may be used in accordance with certain example embodiments.

Figure 5:
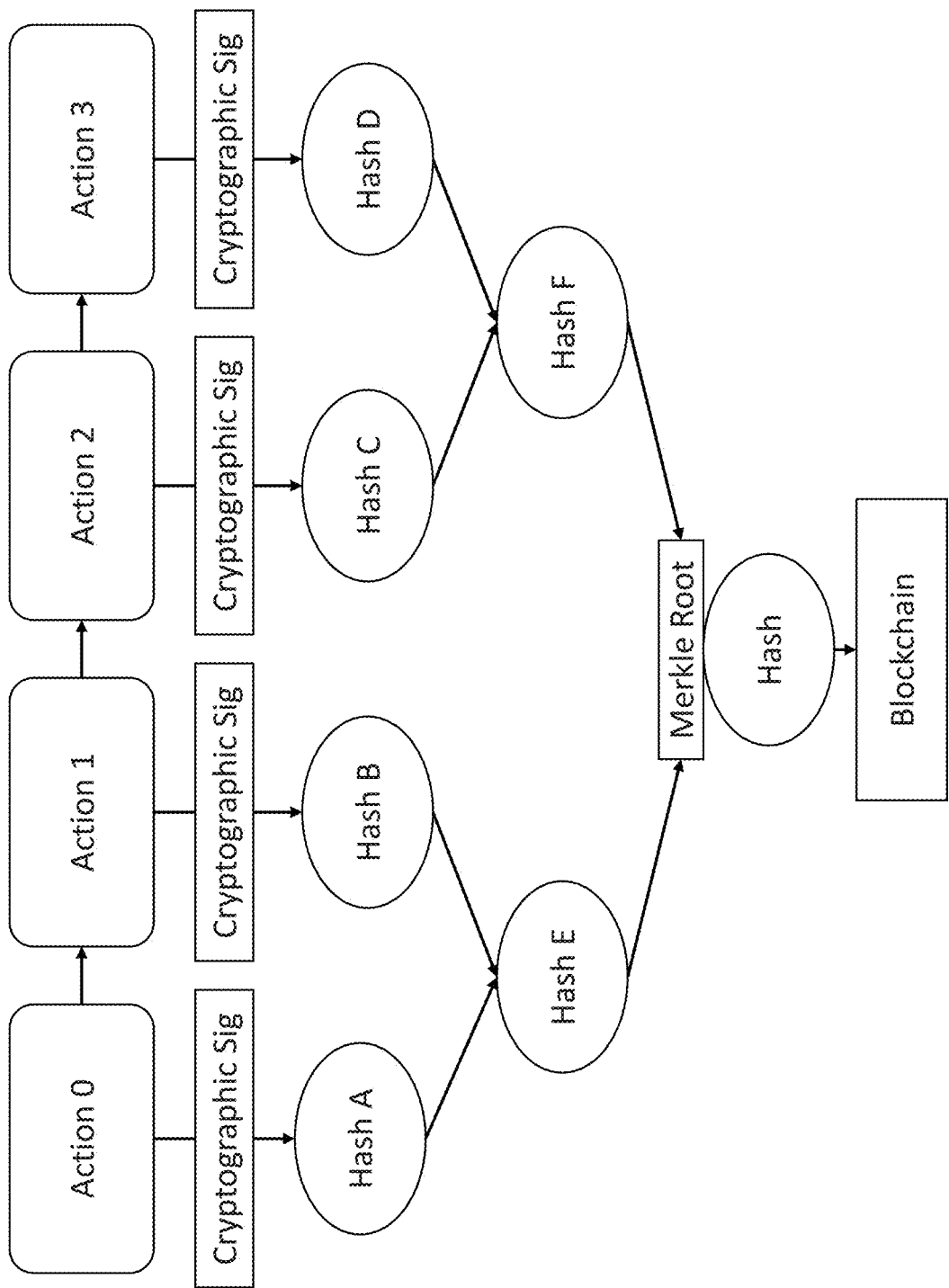
FIG. 5 illustrates cryptographic techniques according to certain example embodiments.

In certain examples, each node may be a virtual machine that is supported by appropriate computer hardware (e.g., as shown in FIG. 5). Thus, multiple nodes may be present on the same underlying "computer." In other examples, each node may be its own physical machine. A blockchain system may also be a combination of these approaches (e.g., both virtual nodes and purely physical nodes).

In certain examples, blockchain 140 may be publically accessible (e.g., anyone can read directly from the blockchain 140). In certain examples, nodes of the blockchain may all be controlled by one entity (e.g., the organization responsible for the cert authority system 104) or a group of entities. In certain examples, access to the blockchain is restricted to only authorized users and/or systems. For example, reading blockchain 140 may be restricted to systems 104 and/or 110. In certain examples, blockchain 140 may be a public blockchain (e.g. the blockchain that is used by Bitcoin).

Returning to FIG. 1, consumer systems 108 are those computer systems that customer B systems 106 consume the content created by a publisher. Consumer systems include news portals (e.g., public facing portals), social media, news agencies, APIs, and other electronic distribution techniques that are used to disseminate the created content to consumers (e.g. users of different ones of customer B computer systems 106).

Verification system 110 is used to verify the creator/publisher of the content and the content being consumed by end users via consumer systems 108. Verification system 110 includes an interface 134 (e.g., a web interface), an API module 136, and service module 138.

Figure 2A:
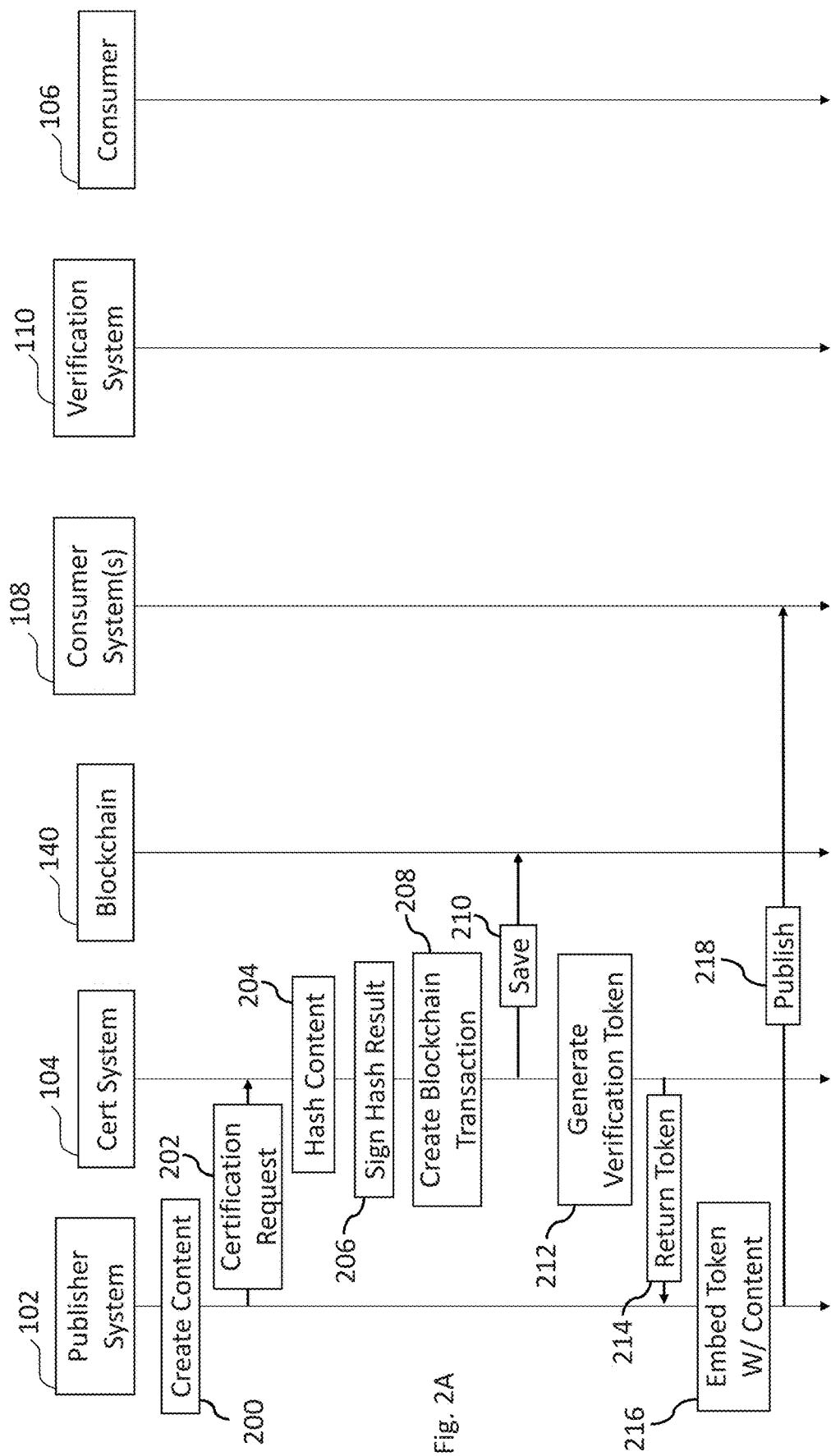
FIGS. 2A and 2B are signal diagrams showing operation for certifying and verifying content using the system shown in FIG. 1.
Figure 2B:
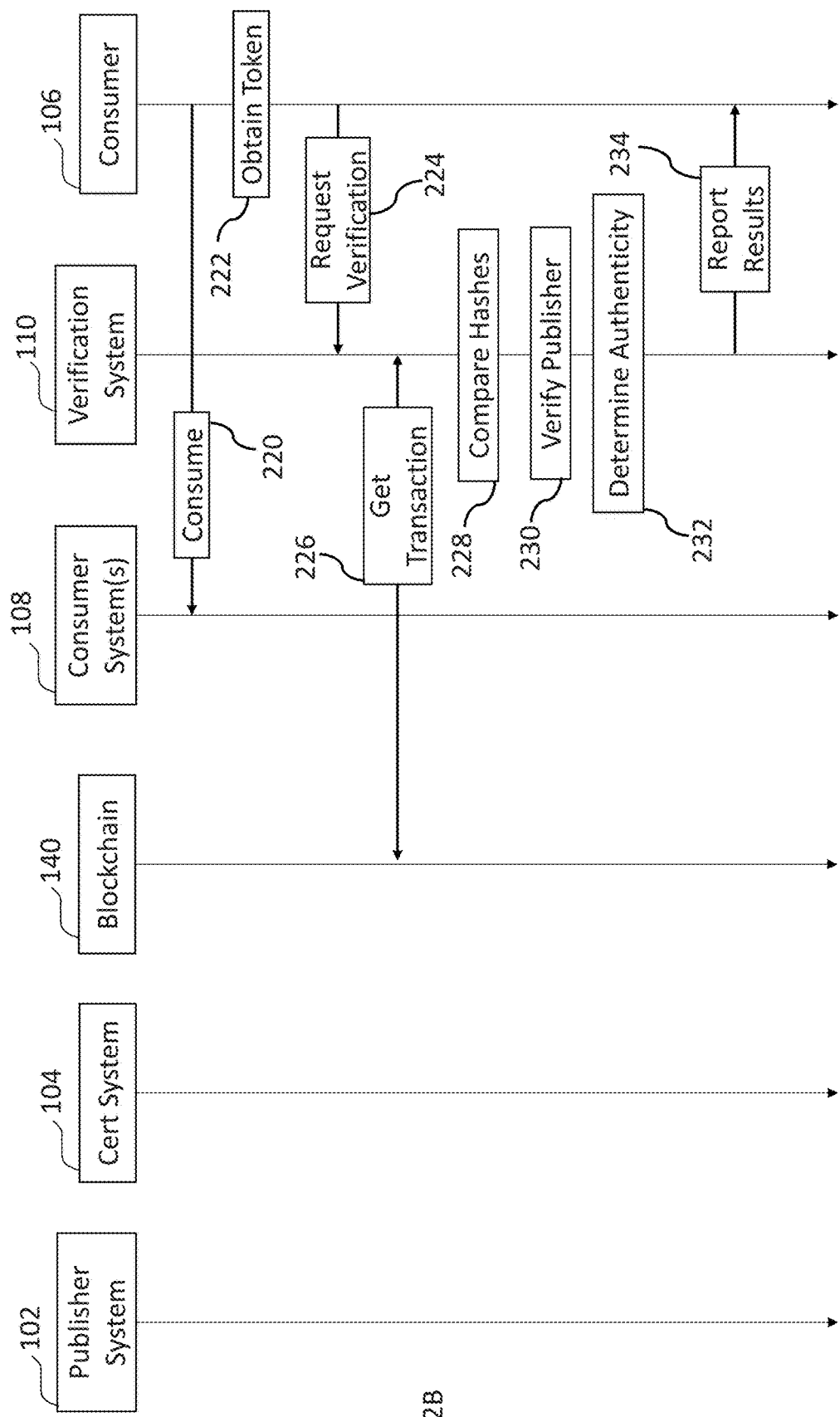

FIGS. 2A and 2B:

FIGS. 2A and 2B are signal diagrams showing operations for certifying and verifying content using the system shown in FIG. 1.

At 200, a publisher of content uses the publisher system(s) 102 to generate or create content. In certain examples, the content is uploaded (e.g., in the form of a file or other data) from a computer being used by a publisher (e.g., a mobile device) to the publisher system(s) 102. Once the content is created and the publisher determines that it is ready for release, a user causes a request from the publisher system 102 to be transmitted or otherwise submitted to the certification system 104 at 202. The request may include the content to be certified. In certain examples, the request may be associated with a publisher digital identity (e.g. that is associated with a cryptographic key stored in crypto key store 114). For example, a publisher that is using publisher system(s) 102 may authenticate against the certification computer system 104 in connection with the submitted request.

At 204, upon reception of the certification request (e.g., in response to the request and based on the content of the request), the certification system may generate a hash of the content that is to be disseminated (or has been disseminated).

At 206, the certification computer system 104 may use the key associated with publisher of the content and "sign" the hash to thereby create a signature for the publisher. In certain examples, the certification computer system 104 may also use the key of the customer that will be consuming the content to "sign" the hash. In certain examples, a key of the customer of the publisher system may also be used to sign the hash (e.g., to create a signature for the publisher's customer).

At 208, the certification computer system 104 generates a blockchain transaction that is based on the hashed content (from step 204), a digital signature associated with the publisher system 102, and/or a digital signature associated with the publisher's customer. The generated blockchain transaction is then written to the blockchain 140 at 210 for incorporation therein.

At 212, the certification computer system 104 generates a verification token. In certain examples, the verification token is based on the generated blockchain transaction, the content, the hash of the content, the digital signatures associated with the content, the keys associated with the publisher or consumer, and/or any combination thereof. In certain example embodiments, the verification token may be a hash of the generated blockchain transaction and/or the transaction identifier of the blockchain transaction.

At 214 the verification token is returned to the publisher computer system 102. In other words, the publisher computer system 102 submits the certification request at step 202 and gets a verification token in response.

At 216, the publisher system 102 embeds the returned token into the content that is to be published and then at 218 the content (with the embedded token) is published to consumer systems 108.

At 220, end users or consumers 106 consume the content that is available from consumer systems. Once the consumers obtain the content, they also obtain the embedded token at 222. In certain examples, the token may be embedded into a hyperlink (e.g., as part of an HTML version of the content). Consumer 106 may click on the hyperlink to trigger verification of the content.

At 224, the computer system (e.g., a desktop, tablet, or other mobile device) submits a verification request to verification computer system 110. The verification request may include the content in question, the token, the (alleged) publisher of content, and/or other data.

In response to the verification request, the verification computer system 110 queries the blockchain 140 for the transaction associated with the token at 226. Upon obtaining the transaction, the verification computer system 110 matches or compares, at 228, the hash of the content with the hash of the content that was stored as part of the transaction.

At 230, the verification computer system 110 verifies the signatures of the publisher and publisher computer systems.

At 232, the authenticity of the content obtained by the consumer is determined and the result of that determination (e.g., from 228 and 230) is returned to the consumer at 234. In certain examples, if the hashed content matches and the signatures are verified, then the verification system returns a positive verification result (e.g., the content being consumed is authentic). If the elements do not match, then the returned result is false (the content is fake).

Thus, given the verification token and the content, it is possible for anyone to verify the content directly from the blockchain (or via the verification system) by using cryptographic techniques. In certain examples, consumers may directly query the blockchain to determine the authenticity of the content (e.g., without involving the verification system. Hence, in certain examples, the system is an open system in which content can be verified by anyone.

In certain example, the verification computer system may include functionality for tracking opinions of end users on the veracity of the content itself. Such techniques may allow building of a trust rating system based upon public voting or opinion.

Figure 3A:
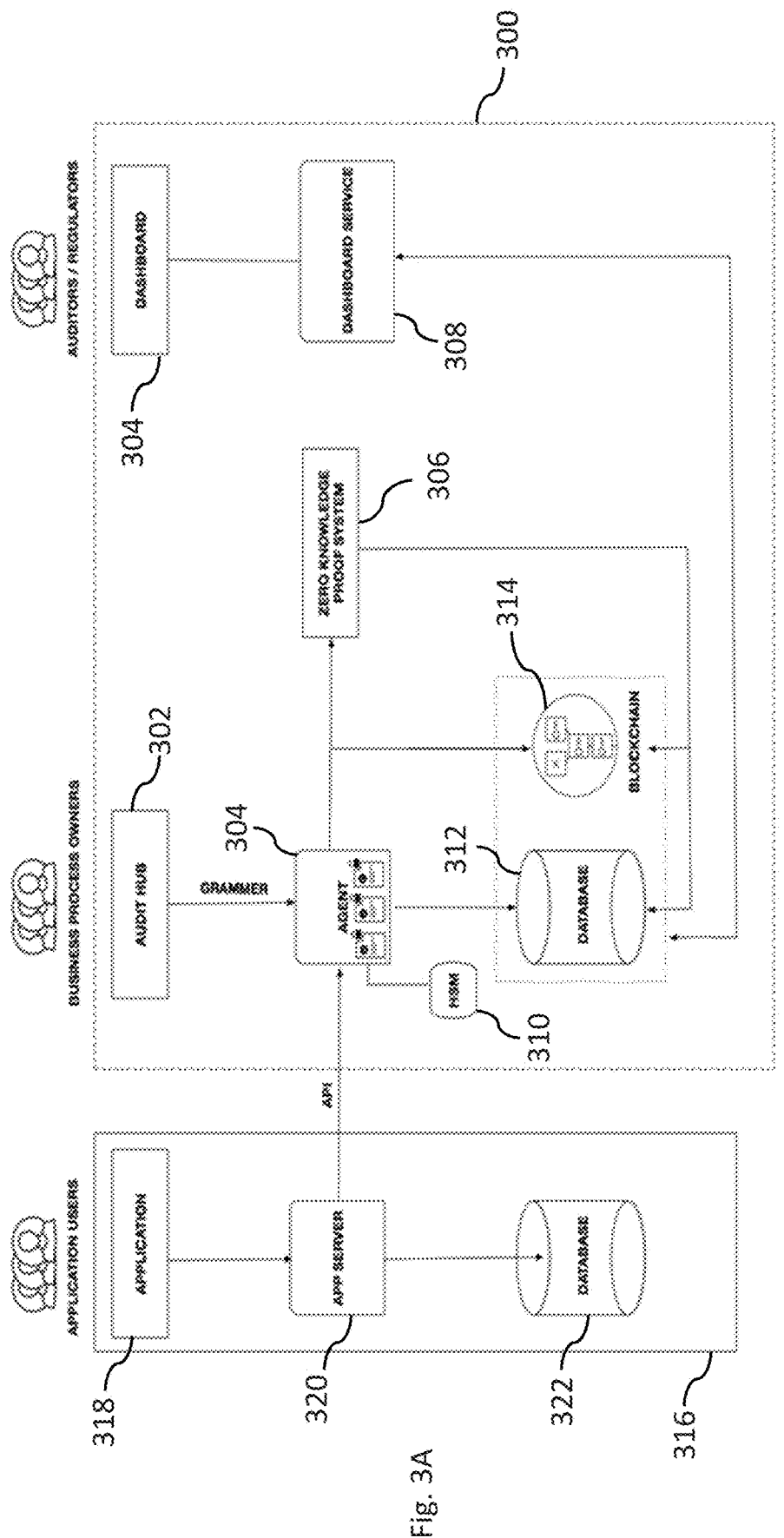
FIG. 3A illustrates another example computer system that implements techniques for a cryptographic audit trail according to certain example embodiments.
Figure 3C:
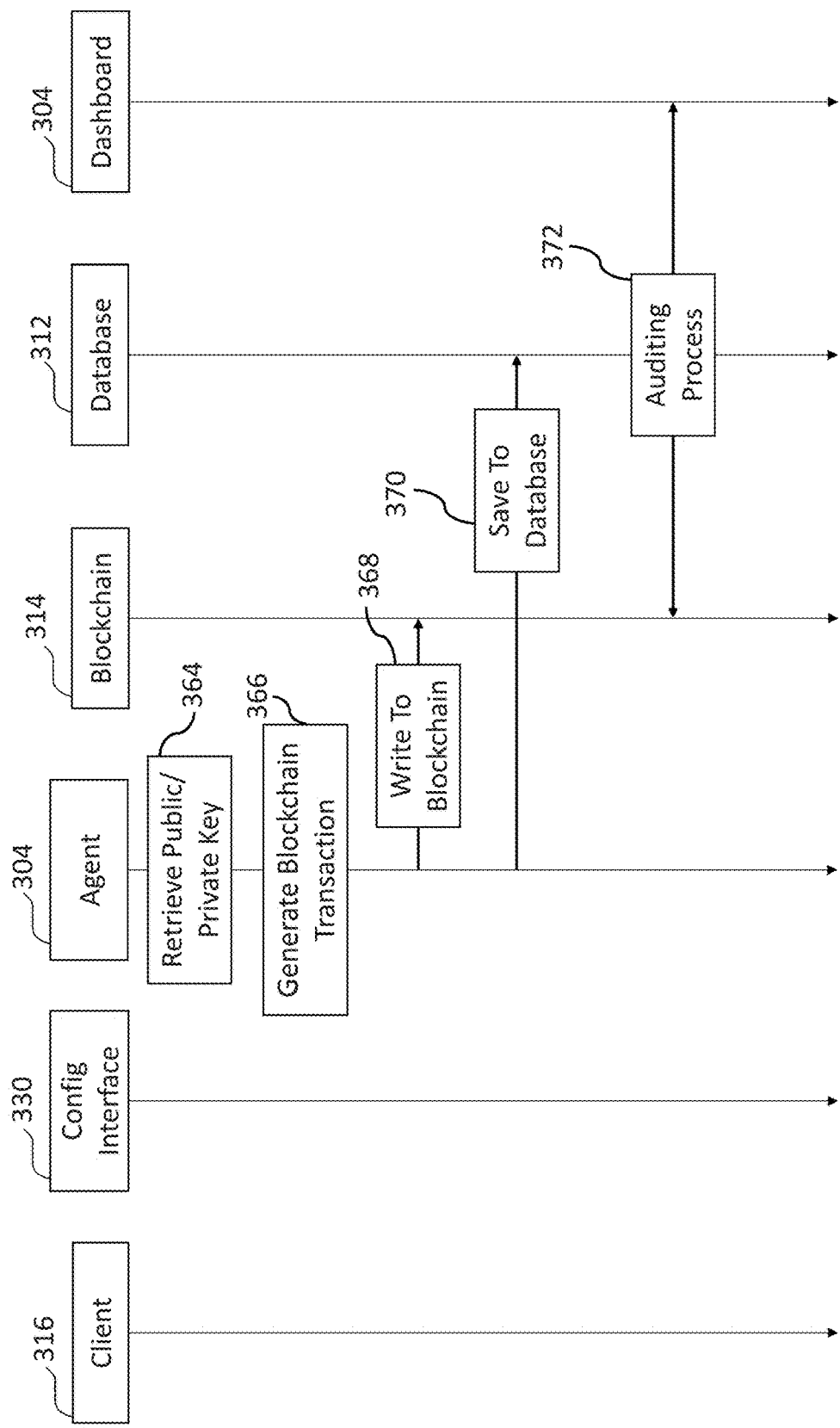

FIGS. 3A-4:

FIG. 3A illustrates another example computer system that implements techniques for a cryptographic audit trail according to certain example embodiments. FIGS. 3B and 3C are signal diagrams showing operation of the system(s) shown in FIG. 3A.

In certain examples, a system for providing a cryptographically provable audit trail is provided in a business process agnostic manner. This may allow, for example, tracking of workflows where responsibilities or tasks move between different users or parties. Possible implementations include, for example, 1) tracking loans across country boundaries (e.g., to determine or ensure that the money from the loan is being used appropriately), tracking financial security related issues (e.g., as understood by the securities exchange commission or SEC), 3) tracking bulk shipping contracts; 4) tracking the custody of physical assets (from printers in an office, to tires in an repair shop, to clothes in a store); 5) tracking assets of historical value; and 6) tracking and logging data as it moves from one system to another and/or is changed. In certain examples, the techniques herein promote information security and data governance in client applications and how data is handled for such applications. The techniques herein may also be used in providing a Digital Rights Management (DRM) platform for the data in question.

Generally, the system shown in FIG. 3A allows for audit or tracking data changes via four different aspects. First, who is performing a modification or doing an action (e.g. the identity). Second, what data is being acted upon or modified. This may include before and after snapshots of the data, hashes of a difference, only those items of a data set being modified, etc. . . . . Third, what time the modification or action occurs. And fourth, what is the context of the modification or action being performed. An example of context may include knowing whether the data modification being performed is in conjunction with the fourth step of a 15 step business process or the fifth step of that same 15 step business process.

The system shown in FIG. 3A includes an example client application 316 that includes a frontend application interface 318, an application service component 320, and a database 322. The client system 316 interfaces with system 300 (e.g., via an API call to the agent service).

Example client application 316 may be an existing application (e.g., one that is already in production) or a new application that is being developed. For example, the client application 316 may be a news distribution-like application (e.g., for disseminating news as discussed in connection with FIG. 1), with functionality for creating multiple user accounts (e.g., utilizing the two-factor authentication) and allowing users to create and edit jobs, which contain information such as headlines, dates, etc. Jobs may be forked, jobs may be duplicated, and/or multiple users can collaborate on various jobs. The client application 316 may include special approver accounts that can approve edits to a job, finalizing the changes made, and the like.

All of the actions allowed by the client application may be hooked into the functionality that is provided by system 300 and the Audit Hub module 302 that is part of system 300. Actions that are performed in application 316 may be linked to endpoints provided by the Audit Hub Module 302. For example, the logic of how a client application works may be created and processed by the audit hub module 302. The logic (e.g., as discussed in connection with the creation of states and state transitions during application registration) can be applied to events or other data that is received by agent service 304. This creates "workflows" that are then used in system 300 to provide for an audit trail representation of the actions a user has made in client application 316. The workflows may be visualized as chains (see FIG. 4), where each action is a link in the chain, as well as the data associated with each action. The data that is included with an action on how the workflows are formed may be driven by the client application 316. Specifically, programming hooks or triggers may be added to the application server module 320 that cause a message to be passed to agent service 304, which then stores the data related to client application action or event.

Applications that desire to use the functionality of system 300 may be required to register with system 300 in order to gain access to the functionality offered by system 300. The registration process may include the following 4 steps: 1) Providing user details and save data field; 2) Define States; 3) Setting up a State Machine Setup; and 4) an Account Overview step. This registration process may be accomplished via a webpage or the like.

For the first step a user inputs his/her email, an organization name, application name, and password. The user can also indicate whether or not system 300 should save the data of their application. In other words, should system 300 store all application data or just hashes of the data and workflows.

The second part of the registration process has the user define states for the workflows of the client application. With the various states defined, then the user defines the transitions between those states (e.g., a denial state cannot transition to an approval state, etc. . . . ). From this information an adjacency matrix for the states may be generated (as shown in the below example JSON snippet). This allows a client to define their own domain specific language that can be related to their specific client application.

Once the state transitions are completed by the user, the registration system may show the states and their transitions to the registering user as a state machine. If everything is acceptable to the user, then they can finalize the registration process. At this point a JSON file (or other technique or data structure for holding the configuration of the state transitions) is created based on the provided registration information. For example, {
    allowStorage: true,
    states: {"Start": [ ], "Edit": [ ], "Approve": [ ]},
    adjMat: {"Start": {"Start": false, "Edit": true, "Approve": true}, "Edit": {"Start": false, "Edit": false, "Approve": true}, "Approve": {"Start": false, "Edit": false, "Approve": false} }
}

In the above example, start, edit, and approve states were defined, and the transitions between those states were then specified (as indicated by the adjMat field). The allowstorage bit is set to true (e.g., from the first step in the registration process). This registration information is passed to system 300 that records it in database 312. In certain examples, in response to the registration process, system 300 may return a secret key that allows access to the API provided via agent service 304.

Accordingly, registration of a client application with system 300 may include defining different states for workflows that are in the client application, as well as the associated data for each state. Adjacency states for the states of a workflow may also be defined. In other words, the configuration may define what states are allowed to follow each state. The configuration may also specify whether or not data for each auditable action (or the entire application) should be stored to the blockchain. If such information is not desired to be stored, then hashes of the data may be calculated along with corresponding cryptographic proofs. The hashes of the data instead of the data may be included into the eventual blockchain transaction that is generated and incorporated into the blockchain. In will be appreciated that certain types of client applications (e.g., those that operate with confidential data) may desire this type of functionality as the underlying blockchain to which the data is written may be a publically accessible blockchain (e.g., the bitcoin blockchain). When a hashed version of the data is stored to the blockchain (as opposed the actual data), other data storage for the actual data may be left to the client application (e.g., to store in database 322).

The agent service 304 serves as an entry point to system 300 for client applications that make use of the auditing and tracking features provided by system 300. Specifically, agent service 304 receives requests (e.g., events) from client applications (e.g., client application 316) that include data that the client application desires to be logged and tracked. In certain examples, every event or request that is submitted through the agent service 304 includes a corresponding user context that is mapped to an identity that is stored in the hardware security module 310 (e.g., the private and public keys for that identity are stored in the HSM). This identity information is then used in the creation of transactions that are based on the event information.

Data that is passed to the agent service 304 by the client application 316 may be visualized (e.g., in real-time) via the dashboard service module 308 and the frontend dashboard 304 (both are described in greater detail below).

In certain example embodiments, agent service utilizes Node.js for its architecture and a database 312 for storing workflow information received from clients. An example database may be MongoDB.

The runtime interaction between client application 316 and the agent service 304 has the application workflow process of the client application 316 communicate with the agent service 304 that then stores the workflow information received from the client application to database 312. The agent service 304 also interacts with blockchain service 314 and a corresponding blockchain where the above noted 4 different aspects that are being tracked may be stored (or hashes thereof). In certain example embodiments, the blockchain service 314 is setup so that different types of blockchain chains (e.g., Ethereum, hyperledger, Dash etc.) may be used.

Once a client application is registered it can then send requests to the agent service 304. Such requests may be sent as HTTP POST requests or via another defined API. These requests may contain the name of the client application the workflow belongs to (and/or the name or identifier of the workflow), the userId/userAlias of the user making the action (which is mapped to an identity in the HSM 310), the state and data of the action, and tags that the client application 316 desires to be included in the audit. The request may also include an indication on whether data should be saved or not and/or whether the workflow should be fossilized. In certain examples, the request may or may not include the hash value of the previous action in the workflow. If no hash is included, then the agent service 304 may assume this is action is the first in a new workflow. The payload for the request may include: 1) an applicationID (e.g., to identify the client application from other client applications), 2) an application key, 3) a userID, 4), the state, 5) the data, and 6) metadata associated with the request.

In response to reception of a request, the agent service 304, and in conjunction with the grammar applied by the audit hub module 302, may query database 312 for corresponding previous states. The agent service 304 may also organize the received data into another format (e.g., a format that is common to system 300 instead of client application 316). The agent service 304 may also store the newly received action to the database 312. In certain examples, a Merkle proof (see FIG. 5) may be generated should the workflow need to be fossilized. In other words, the Merkle proof provides for a single proof or data item that proves that all child proofs are still valid (e.g., have not been changed from an originally generated Merkle proof). Thus, if a piece of information from an event is retroactively changed, the corresponding child proofs, and thus the Merkle proof will also change. Such changes may be recognized because the final proof—the Merkle proof is no longer the same. In certain example embodiments, the merkle proof may be comprised of a 32 bit hash value for the corresponding childproofs (and their corresponding data items or event data). The updated data may then be posted (or otherwise made available) to the dashboard 304 (e.g., via a Web Socket).

For each state transition that is generated as a result of an event that is sent to the agent service, the system 300 generates a new blockchain transaction (via the blockchain service 314) and stores that transaction to the blockchain. Thus, for example, each of the states shown in FIG. 4 includes a corresponding blockchain transaction that has been cryptographically incorporated into the blockchain (e.g., the transaction, and thus the corresponding action that was performed in application 316, becomes immutable). To further explain, the left most node in FIG. 4 may be the genesis block and the various forks may be side chains that are generated.

Figure 4:
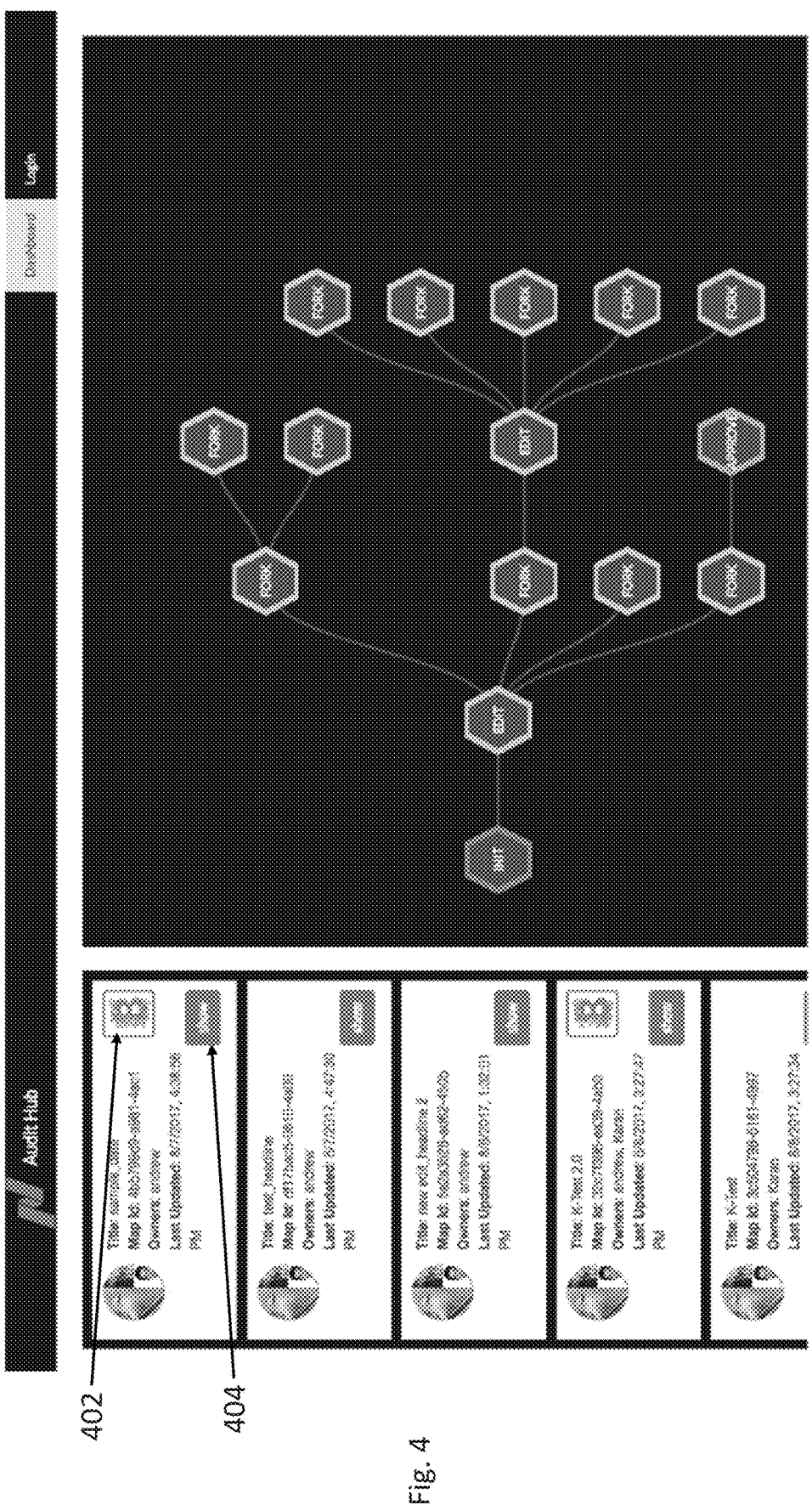
FIG. 4 is a screenshot of a dashboard that is used to graphically show an audit trail of digital content according the system in FIG. 3A.

System 300 may also include a dashboard service 308 and corresponding user interface 304 (a dashboard) that allows a user to interact with the content being recorded. An example user interface is shown in FIG. 4. Specifically, as shown in FIG. 4, the various state changes to a workflow from a client application is shown. The example shown in FIG. 4 is for a client application that handles news releases and the like (e.g., a news release may be forked and/or edited numerous times before being released). The dashboard allows a user to see how the news release changed from the initial state to a current (or final) state.

A user (e.g., an administrator) can select any of the individual panels in the list on the left-hand side of the dashboard to open a specific workflow. The right side shows a specific workflow. Clicking each of the individual hexagon-shaped segments may display an info box containing information about that segment, including user alias, timestamp, data, and link hashes. The info box may also contain a verify button. A user can trigger a verification action that will start a process for verifying the user who created that particular segment or action in the workflow. The verification process may include comparing a current picture of the user at the time of verification to a picture that was taken at the time the action was stored.

On the left-hand panel, a user may can also select the show button 404 to show the same segments of a workflow in chronological order. Button 402 may also be available for certain workflows and when clicked the Merkle tree for that workflow may be shown. Button 402 may only be shown if the workflow has an "Approve" segment, indicating that it has been fossilized and committed to a blockchain.

System 300 may also include a zero knowledge proof system 306. In certain instances, users may be required to submit a current photograph of themselves that is stored along with the data that they are working on. Facial recognition may then be used to determine that person A is, in fact, user A (e.g., biometric data).

Turning to FIGS. 3B and 3C, a signal diagram is shown that illustrates how the systems in FIG. 3A may be used in certain example embodiments.

At 350, a user (e.g., an administrator) that wishes to modify a client application 316 (or as part of creating a new client application) defines the various states that will be used for determining when and how data related to events will be captured by system 300.

At 352, a state machine is generated that uses the states defined at 350. The state machine may define, for example, what transitions can (and conversely cannot) occur between the various states. For example, a beginning state may transition to an edit state, but not vice versa. Based on the generated states and the state machine, a configuration data structure is generated that may be saved to a file (e.g., a JSON file or other file format).

At 354, the configuration is applied (e.g., uploaded, transmitted, etc. . . . ) to system 300 via configuration interface 330. The configuration interface may be an interface that is used by administrators or other users to configure the operation of system 300. For example, the configuration may be applied to system 300 by setting up Agent 304 to use the generated configuration in response to reception of events or other data that will be transmitted from client application 316.

At 356, the application layer of client application 316 may be updated. For example, the application layer may be modified to make REST (Representational state transfer) calls (e.g., a web service) to system 300 and agent 304 thereof. In certain examples, there may be one call for each state change as is represented by the generated configuration.

Once client application 316 and system 300 are updated as discussed above, then a user may normally use client application at 358. It will be appreciated that the modification/configuration of the client application 316 (e.g., the application layer thereof) may not be visible to the user. In other words, the changes to client system 316 may be transparent to the user.

At 360, the user uses client application 316. During this use those actions that correspond to the previously defined state changes may be caught at the application layer of client application 316 and trigger a call (e.g., a REST call) to system 300.

At 362, the application layer of client application 316 initiates a call (e.g., a REST call or other API call) to agent 304. Information that is included with the call may include, 1) identity information (e.g., a userID), 2) the data being acted upon (e.g., the user is updating fields in a customer database), 3) a timestamp, and 4), the context of the modification being performed.

In response to reception of the call at agent 304, the public and/or private key information associated with the user identity information included in the call is retrieved.

At 366, based on information included in the call, a blockchain transaction is generated. The contents of the blockchain transaction may be as described above in connection with FIG. 3A.

At 368, the generated blockchain transaction is written to the blockchain. Information that is associated with the original call from application 316, but is not included in the blockchain transaction, may also be saved to a separate internal database 312 at 370.

At a subsequent time, a user may access dashboard 304 and perform auditing at 372 by accessing information that is stored on blockchain 314.

Accordingly, usage of client application 316 by an ordinary user may be captured and forwarded to system 300. System 300 may generate a blockchain transaction based on this usage and record the same to a blockchain. Another user can then review a dashboard to verify and/or inspect the transaction stored to the blockchain. In certain examples, automated alerts may be generated based on state changes and/or information received from client application 316 that does not match the data stored to the blockchain.

FIG. 5

FIG. 5 illustrates cryptographic techniques according to certain example embodiments. Such techniques may be applied to the system shown in FIG. 3A.

Actions 0 through 3 comprise a workflow. As described herein, each action or transition between states of this workflow results in an event or call to system 300 from the corresponding client application. Included in each of the events that is captured by system 300 are the user associated with the action (A), the data the action is acting on (B), the time stamp for the action (C), and the context associated with the action (D).

In response to the reception of this information, system 300 creates a cryptographic signature based on this information. The signature is created with the private key of the user that performed the action. In other words, Signature=$key_{user}$ (A, B, C, D). This corresponds to the second level shown in FIG. 5.

The generated signature is then hashed. This corresponds to the third level shown in FIG. 5. As the user performs further actions, each action is logged in the same manner. Thus, a signature and hash are created for each of actions 0, 1, 2, and 3. Additionally, the "current" hash links to the previous hash and thereby forms a hash chain. The generated signatures and hashes are stored in a local database (e.g., database 312). This information may be called a side chain.

The created hash chain is further processed to generate further data. In certain examples, this further data is the Merkle Root of the hashes using the Merkle tree algorithm. The further processed data (e.g., the Merkle Root) is then saved to the blockchain via blockchain service 314 by creating a transaction and adding the Merkle Root (or other calculated data) in, for example, the user data field of the blockchain transaction. The blockchain transaction is then submitted to the underlying blockchain. Once the transaction is confirmed, the transaction ID is stored along with the other proof in database 312.

FIG. 6

Figure 6:
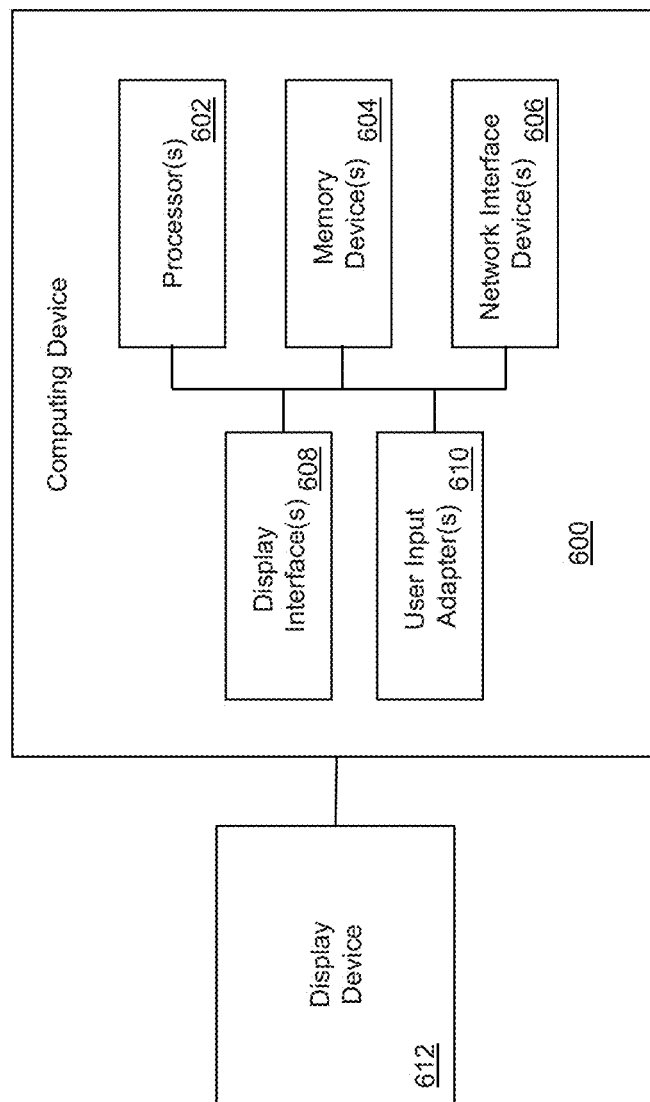
FIG. 6 shows an example computing device that may be used in some embodiments to implement features described herein.

FIG. 6 is a block diagram of an example computing device 600 (which may also be referred to, for example, as a "computing device," "computer system," or "computing system") according to some embodiments. In some embodiments, the computing device 600 includes one or more of the following: one or more processors 602; one or more memory devices 604; one or more network interface devices 606; one or more display interfaces 608; and one or more user input adapters 610. Additionally, in some embodiments, the computing device 600 is connected to or includes a display device 612. As will explained below, these elements (e.g., the processors 602, memory devices 604, network interface devices 606, display interfaces 608, user input adapters 610, display device 612) are hardware devices (for example, electronic circuits or combinations of circuits) that are configured to perform various different functions for the computing device 600.

In some embodiments, each or any of the processors 602 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 602 uses an instruction set architecture such as x86 or Advanced RISC Machine (ARM).

In some embodiments, each or any of the memory devices 604 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 602). Memory devices 604 are examples of non-volatile computer-readable storage media.

In some embodiments, each or any of the network interface devices 606 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 608 is or includes one or more circuits that receive data from the processors 602, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 612, which displays the image data. Alternatively or additionally, in some embodiments, each or any of the display interfaces 608 is or includes, for example, a video card, video adapter, or graphics processing unit (GPU).

In some embodiments, each or any of the user input adapters 610 is or includes one or more circuits that receive and process user input data from one or more user input devices (not shown in FIG. 6) that are included in, attached to, or otherwise in communication with the computing device 600, and that output data based on the received input data to the processors 602. Alternatively or additionally, in some embodiments each or any of the user input adapters 610 is or includes, for example, a PS/2 interface, a USB interface, a touchscreen controller, or the like; and/or the user input adapters 610 facilitates input from user input devices (not shown in FIG. 6) such as, for example, a keyboard, mouse, trackpad, touchscreen, etc. . . . .

In some embodiments, the display device 612 may be a Liquid Crystal Display (LCD) display, Light Emitting Diode (LED) display, or other type of display device. In embodiments where the display device 612 is a component of the computing device 600 (e.g., the computing device and the display device are included in a unified housing), the display device 612 may be a touchscreen display or non-touchscreen display. In embodiments where the display device 612 is connected to the computing device 600 (e.g., is external to the computing device 600 and communicates with the computing device 600 via a wire and/or via wireless communication technology), the display device 612 is, for example, an external monitor, projector, television, display screen, etc. . . . .

In various embodiments, the computing device 600 includes one, or two, or three, four, or more of each or any of the above-mentioned elements (e.g., the processors 602, memory devices 604, network interface devices 606, display interfaces 608, and user input adapters 610). Alternatively or additionally, in some embodiments, the computing device 600 includes one or more of: a processing system that includes the processors 602; a memory or storage system that includes the memory devices 604; and a network interface system that includes the network interface devices 606.

The computing device 600 may be arranged, in various embodiments, in many different ways. As just one example, the computing device 600 may be arranged such that the processors 602 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 600 may be arranged such that: the processors 602 include two, three, four, five, or more multi-core processors; the network interface devices 606 include a first network interface device that implements Ethernet and a second network interface device that implements WiFi and/or Bluetooth; and the memory devices 604 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the Certification Authority computer system 104, publisher systems 102, consumer systems 108, verification computer system 110, system 300, along with the modules and/or services of each of these, each of which will be referred to individually for clarity as a "component" for the remainder of this paragraph, may be implemented using an example of the computing device 600 of FIG. 5. In such embodiments, the following applies for each component: (a) the elements of the 600 computing device 600 shown in FIG. 6 (i.e., the one or more processors 602, one or more memory devices 604, one or more network interface devices 606, one or more display interfaces 608, and one or more user input adapters 610), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 604 (e.g., in various embodiments, in a volatile memory device such as a RAM or an instruction register and/or in a non-volatile memory device such as a flash memory or hard disk) and all actions described herein as performed by the software modules are performed by the processors 602 in conjunction with, as appropriate, the other elements in and/or connected to the computing device 600 (i.e., the network interface devices 606, display interfaces 608, user input adapters 610, and/or display device 612); (c) alternatively or additionally, to the extent it is described herein that the component processes and/or otherwise handles data, in some embodiments, such data is stored in the memory devices 604 (e.g., in some embodiments, in a volatile memory device such as a RAM and/or in a non-volatile memory device such as a flash memory or hard disk) and/or is processed/handled by the processors 602 in conjunction, as appropriate, the other elements in and/or connected to the computing device 600 (i.e., the network interface devices 606, display interfaces 608, user input adapters 610, and/or display device 612); (d) alternatively or additionally, in some embodiments, the memory devices 602 store instructions that, when executed by the processors 602, cause the processors 602 to perform, in conjunction with, as appropriate, the other elements in and/or connected to the computing device 600 (i.e., the memory devices 604, network interface devices 606, display interfaces 608, user input adapters 610, and/or display device 512), each or any combination of actions described herein as performed by the component and/or by any software modules described herein as included within the component.

The hardware configurations shown in FIG. 6 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 6, (e) via other hardware arrangements, architectures, and configurations, and/or via combinations of the technology described in (a) through (e).

Technical Advantages of Described Subject Matter

According to the example embodiments herein, tracking and/or auditing changes to content and/or data may provide for quicker and more accurate accounting of information (e.g., in the case of unauthorized intrusion into a computer system).

In certain examples, an audit hub provides a cryptographic proof of the state changes of information. In the event of tamping with such information, an alert may be triggered. This solution thus can improve how content or data is monitored.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-2B, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system for auditing events that are caused by a computer application program executing on a remote computing system(s), the computer system comprising:
a non-transitory computer readable storage medium configured to store a state machine that defines transitions between defined states of the state machine;

a processing system that includes at least one hardware
   processor, the processing system configured to:
   receive event data associated with an action that has
      occurred in the application program on the remote
      computing system, the event data including a) identity data for a first user that is using the application
      program, b) data that is based on the action performed, c) a time stamp for the action, and d) a
      context associated with the action;
   retrieve a private key that is linked to the identity data
      for the first user;
   generate a signature by applying the retrieved private
      key to the received event data;
   generate a hash of the generated signature;
   generate a merkle root based on the generated hash of
      the generated signature;
   generate a blockchain transaction based on the generated merkle root and submit the generated blockchain transaction to a blockchain computing node for
      incorporation into a blockchain.

2. The computer system of claim 1, wherein the processing system is further configured to:
   generate a hash chain based on multiple different events
      that are received,
   wherein the generated merkle root is based on the hash
      chain.

3. The computer system of claim 1, wherein the merkle root is stored in the user data field of the blockchain transaction.

4. The computer system of claim 1, wherein the processing system is further configured to:
   store the generated signature to a database that is separate
      from the blockchain.

5. The computer system of claim 1, wherein the blockchain transaction is further based on the state machine that is stored in the non-transitory computer readable storage medium.

6. The computer system of claim 5, wherein the action that is included in the event data corresponds to at least one of the transitions between defined states of the state machine.

7. The computer system of claim 1, wherein the processing system is further configured to generate an adjacency matrix based on the state machine.

8. The computer system of claim 1, wherein the data that is based on the action performed is a hash of data from the application program.

9. The computer system of claim 1, wherein the context associated with the action includes data that indicates which one of a plurality possible steps the action was performed in conjunction with.

10. The computer system of claim 1, wherein the event data further includes a hash value associated with a previous action.

11. The computer system of claim 1, wherein the event data further includes a value that indicates a hash value associated with a previous action.

12. The computer system of claim 1, wherein the event data further includes data that indicates whether the data that is based on the action performed is to be included into the blockchain transaction or not.

13. The computer system of claim 1, wherein the processing system is further configured to generate a visual display that is based on defined statement machine and multiple different instances of event data that have been received.

14. A method for auditing events that are caused by a computer application program executing on a remote computing system(s), the method comprising:
   storing, to a non-transitory computer readable storage
      medium, a state machine that defines transitions
      between defined states of the state machine;
   receiving, via a transceiver, event data associated with an
      action that has occurred in the application program on
      the remote computing system, the event data including
      a) identity data for a first user that is using the application program, b) data that is based on the action
      performed, c) a time stamp for the action, and d) a
      context associated with the action;
   obtaining a private key that is linked to the identity data
      for the first user;
   generating a signature by applying the retrieved private
      key to the received event data;
   generating a hash of the generated signature;
   generating a merkle root based on the generated hash of
      the generated signature;
   generating a blockchain transaction based on the generated merkle root; and
   submitting the generated blockchain transaction to a
      blockchain computing node for incorporation into a
      blockchain.

15. The method of claim 14, further comprising:
   generating a hash chain based on multiple different events
      that are received,
   wherein the generated merkle root is based on the hash
      chain.

16. The method of claim 14, wherein the merkle root is stored in the user data field of the blockchain transaction.

17. The method of claim 14, further comprising: storing the generated signature to a database that is separate from the blockchain.

18. The method of claim 14, further comprising determining, based on a data field in the event data, whether to include the data included event data into the blockchain transaction.

19. The method of claim 14 further comprising hashing the data included in the event data, wherein the generated blockchain transaction includes the hash of the data.

20. A non-transitory computer readable storage medium comprising a program for use with a computer system that includes at least one processor, the program comprising instructions configured to cause the at least one processor to perform operations comprising:
   storing, to a non-transitory computer readable storage
      medium, a state machine that defines transitions
      between defined states of the state machine;
   receiving, via a transceiver, event data associated with an
      action that has occurred in the application program on
      the remote computing system, the event data including
      a) identity data for a first user that is using the application program, b) data that is based on the action
      performed, c) a time stamp for the action, and d) a
      context associated with the action;
   obtaining a private key that is linked to the identity data
      for the first user;
   generating a signature by applying the retrieved private
      key to the received event data;
   generating a hash of the generated signature;
   generating a merkle root based on the generated hash of
      the generated signature;
   generating a blockchain transaction based on the generated merkle root; and submitting the generated blockchain transaction to a blockchain computing node for incorporation into a blockchain.

\* \* \* \* \*